US012600152B2

(12) United States Patent
Ueno

(10) Patent No.: US 12,600,152 B2
(45) Date of Patent: Apr. 14, 2026

(54) LIQUID DISCHARGE APPARATUS

(71) Applicant: Satoshi Ueno, Tokyo (JP)

(72) Inventor: Satoshi Ueno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 200 days.

(21) Appl. No.: 18/534,278

(22) Filed: Dec. 8, 2023

(65) Prior Publication Data

US 2024/0208257 A1 Jun. 27, 2024

(30) Foreign Application Priority Data

Dec. 26, 2022 (JP) ................................ 2022-208406

(51) Int. Cl.

*B41J 29/377* (2006.01)
*B41J 2/045* (2006.01)
*B41M 5/00* (2006.01)

(52) U.S. Cl.

CPC ......... *B41J 29/377* (2013.01); *B41J 2/04541* (2013.01); *B41J 2/04586* (2013.01); *B41M 5/0017* (2013.01)

(58) Field of Classification Search

CPC .. B41J 29/377; B41J 2/04541; B41J 2/04586; B41J 29/02; B41J 2/1714; B41J 29/13; B41M 5/0017

See application file for complete search history.

(56) References Cited

U.S. PATENT DOCUMENTS

2011/0109689 A1* 5/2011 Sugimoto .............. B41J 29/377 347/25
2017/0136784 A1 5/2017 Ueno
2018/0154656 A1 6/2018 Ueno et al.
2020/0290370 A1 9/2020 Ueno
2020/0298591 A1 9/2020 Ueno et al.
2021/0237467 A1 8/2021 Kemma et al.
2021/0316556 A1 10/2021 Sekiguchi et al.
2023/0271430 A1* 8/2023 Kobayashi ............. B41J 3/4078

FOREIGN PATENT DOCUMENTS

JP 2009-119704 A 6/2009
JP 2019-025668 A 2/2019
JP 2020-037252 A 3/2020

* cited by examiner

*Primary Examiner* — Thinh H Nguyen
(74) *Attorney, Agent, or Firm* — Harness, Dickey & Pierce, P.L.C.

(57) ABSTRACT

A liquid discharge apparatus includes a liquid discharge head, an electronic board, circuitry, and an isolator. The liquid discharge head discharges liquid downward. The circuitry on the electronic board controls the liquid discharge head. The isolator is disposed between the liquid discharge head and the electronic board to isolate the liquid discharge head from the electronic board. The isolator includes a first isolator and a second isolator. The first isolator surrounds four lateral sides of the liquid discharge head. The second isolator contacts the first isolator and surrounds the four lateral sides above the liquid discharge head.

5 Claims, 13 Drawing Sheets

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-208406, filed on Dec. 26, 2022, in the Japan Patent Office, the entire disclosure of which is hereby incorporated by reference herein.

BACKGROUND

Technical Field

Embodiments of the present disclosure relate to a liquid discharge apparatus.

Related Art

In a liquid discharge apparatus that discharges ink as liquid, in addition to liquid droplets discharged from liquid discharge heads to form an image, liquid mists smaller in size than the liquid droplets are generated. Such liquid mists may deteriorate image quality and contaminate components inside the liquid discharge apparatus. In particular, in a textile printer, a pretreatment liquid is applied to a fabric before ink is applied to the fabric. Such a pretreatment liquid has high electrical conductivity. For this reason, when the pretreatment liquid is scattered as liquid mists, a failure of an electronic board in the liquid discharge apparatus may be caused.

A liquid discharge apparatus includes a first head to discharge a pretreatment liquid, a second head to discharge ink, and an exhaust device. The exhaust device generates airflows that flow from the second head toward the first head to prevent the pretreatment liquid from scattering toward the second head. An isolating member is disposed between the first head and the second head.

SUMMARY

In an embodiment of the present disclosure, a liquid discharge apparatus includes a liquid discharge head, an electronic board, circuitry, and an isolator. The liquid discharge head discharges liquid downward. The circuitry is disposed on the electronic board to control the liquid discharge head. The isolator is disposed between the liquid discharge head and the electronic board to isolate the liquid discharge head from the electronic board. The isolator includes a first isolator and a second isolator. The first isolator surrounds four lateral sides of the liquid discharge head. The second isolator contacts the first isolator and surrounds the four lateral sides above the liquid discharge head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
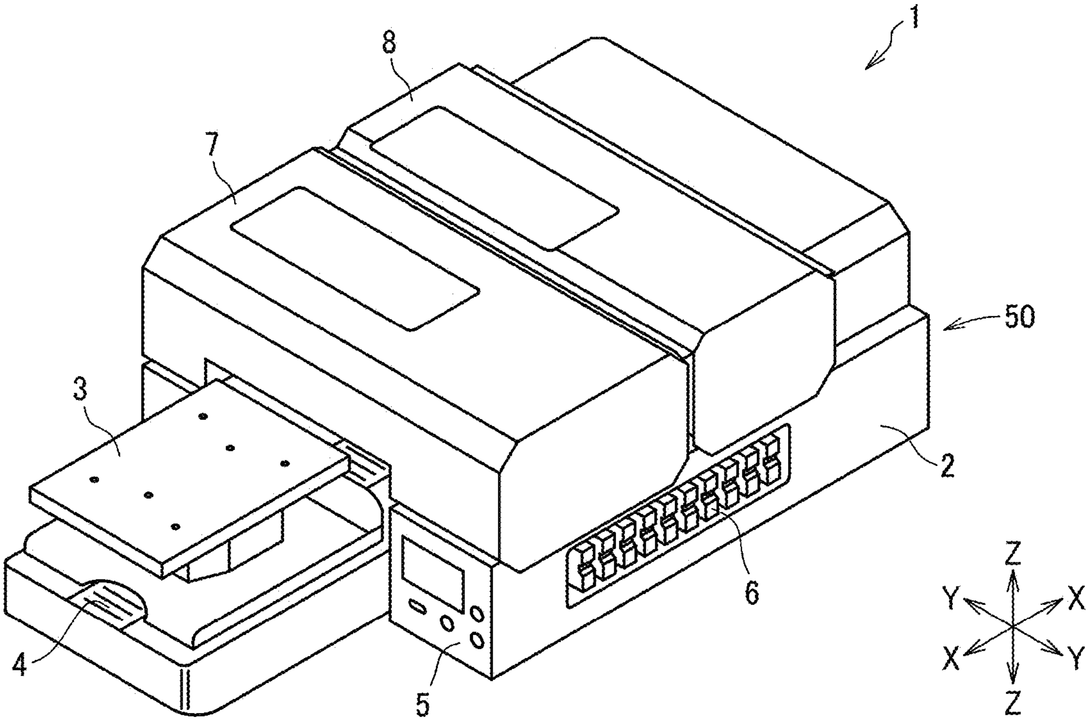
FIG. 1 is a perspective view of a liquid discharge apparatus with covers closed, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like or equivalent components and overlapping description of those components may be simplified or omitted as appropriate. A liquid discharge apparatus according to embodiments of the present disclosure is a textile printer that discharges liquid onto a fabric as a recording medium to form an image.

Figure 2:
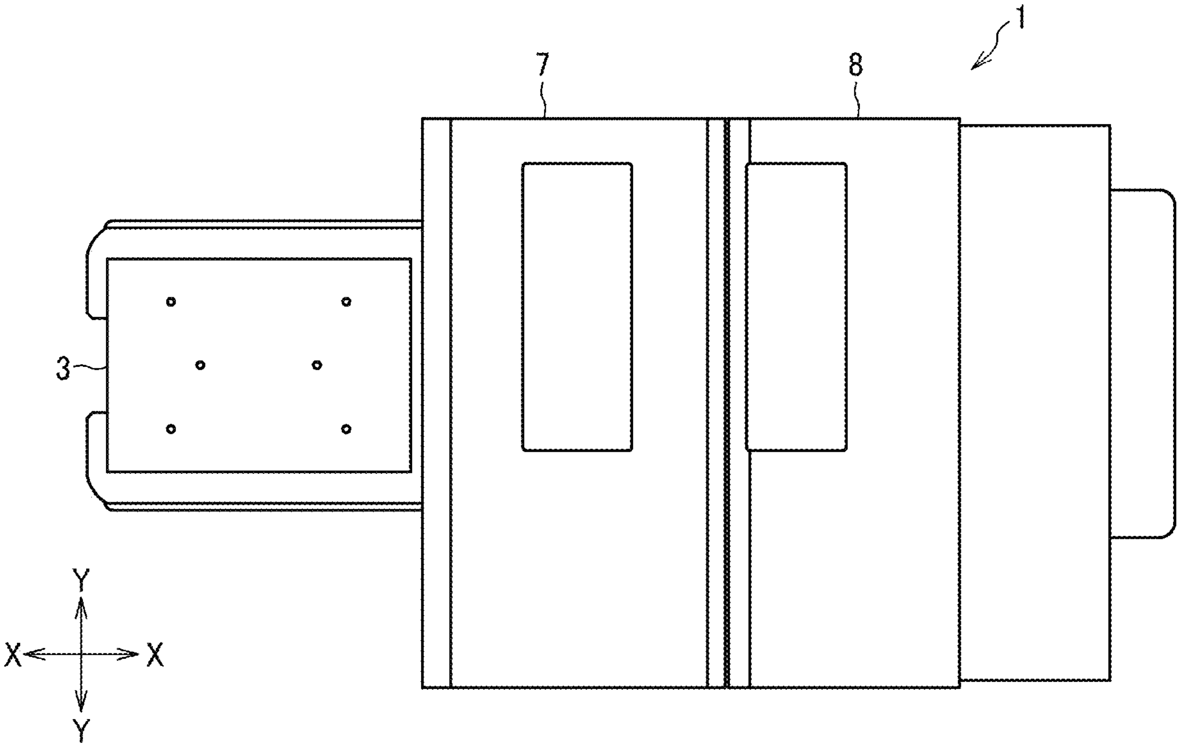
FIG. 2 is a plan view of the liquid discharge apparatus of FIG. 1.
Figure 3:
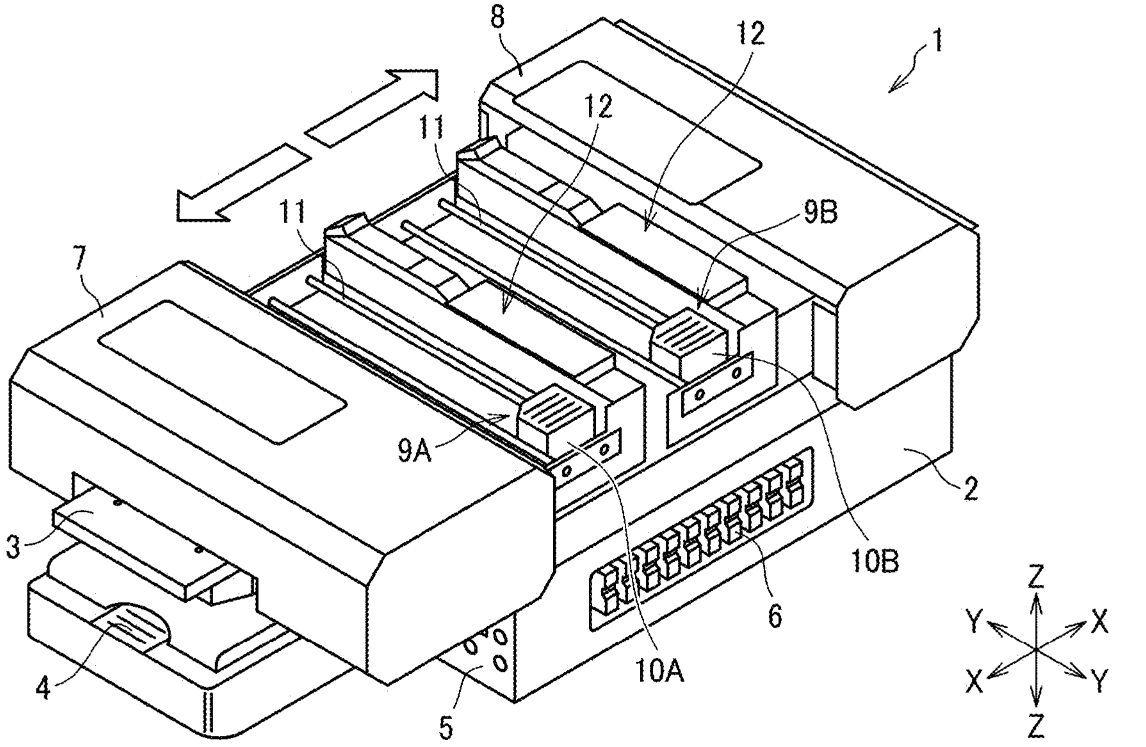
FIG. 3 is a perspective view of the liquid discharge apparatus of FIG. 1 with the covers opened.
Figure 4:
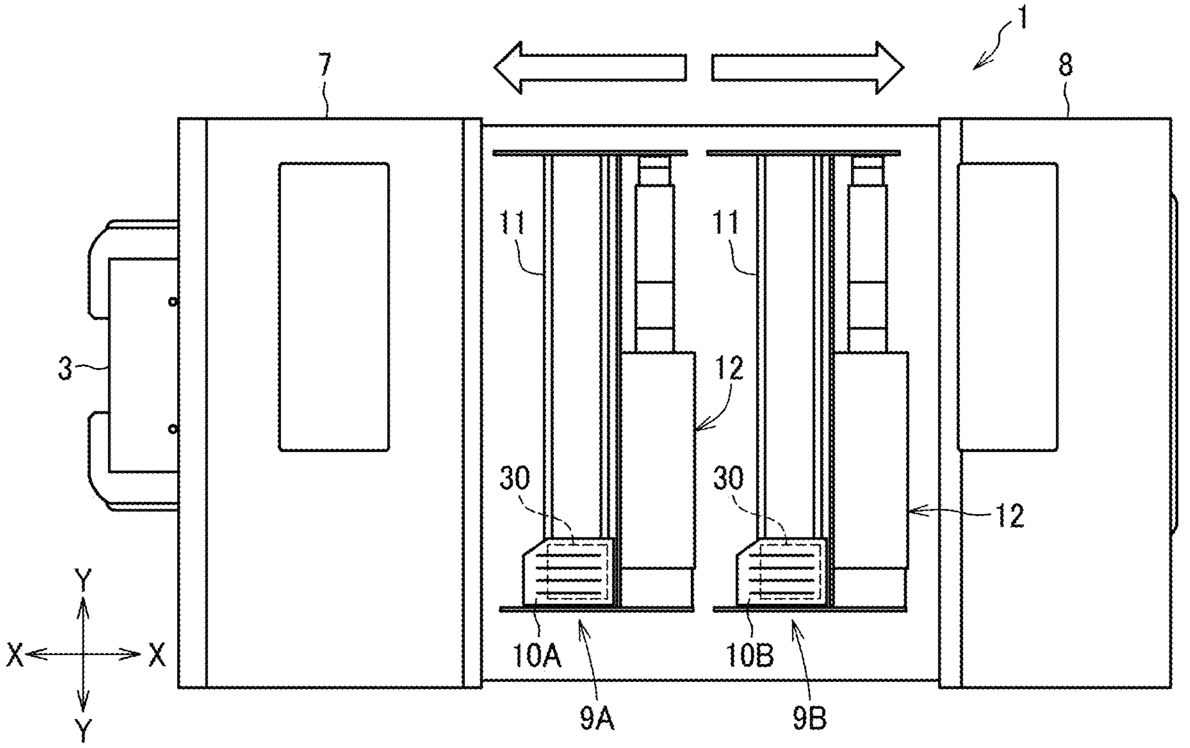
FIG. 4 is a plan view of the liquid discharge apparatus of FIG. 3 with the covers opened.

FIG. 1 is a perspective view of a liquid discharge apparatus 1 with covers closed, according to an embodiment of the present disclosure. FIG. 2 is a plan view of the liquid discharge apparatus 1. FIG. 3 is a perspective view of the liquid discharge apparatus 1 with the covers opened. FIG. 4 is a plan view of the liquid discharge apparatus 1 with the covers opened. In FIG. 1, a direction indicated by double-headed arrow X is a front-rear direction and a sub-scanning direction of the liquid discharge apparatus 1, or a conveyance direction of a recording medium, which may also be referred to simply as X direction in the following description. A direction indicated by double-headed arrow Y is a width direction or a main-scanning direction of the liquid discharge apparatus 1, which may also be referred to simply as Y direction in the following description. A direction indicated by double-headed arrow Z is a direction in which liquid is discharged and a direction opposite to the direction in which liquid is discharged or a vertical direction, which may also be referred to simply as Z direction in the following description. The X and Y directions are parallel to a surface of the recording medium onto which the liquid is discharged, placed on a stage of the liquid discharge apparatus 1. However, the X and Y directions may not be fully parallel to the surface of the recording medium. The X, Y, and Z directions are orthogonal to each other. However, angles at which the X, Y, and Z directions are orthogonal to each other may have some errors.

As illustrated in FIGS. 1 and 2, the liquid discharge apparatus 1 includes a stage 3 in front of a housing 2. The stage 3 is disposed above a guide rail 4. The guide rail 4 extends in the X direction. An operation panel 5 is disposed on a front side of the housing 2. Ink cartridges 6 are detachably attached to a side surface of the housing 2. A front cover 7 and a rear cover 8 that serve as opening and closing members or covers are disposed on the housing 2.

An upper surface of the stage 3 is a surface on which a recording medium is placed and is flat. The upper surface of the stage 3 is a surface parallel to the X direction and the Y direction. The stage 3 is movable above the guide rail 4 and reciprocally movable in both directions of the X direction. In addition, the stage 3 is movable up and down in both directions of the Z direction. Accordingly, the height of the recording medium placed on the stage 3 can be adjusted.

The front cover 7 and the rear cover 8 are movable in both directions of the X direction. In FIG. 1, the front cover 7 is moved rearward and the rear cover 8 is moved forward with both the front cover 7 and the rear cover 8 closed. By contrast, in FIG. 3, the front cover 7 is moved forward and the rear cover 8 is moved rearward with both the front cover 7 and the rear cover 8 opened. Such a configuration as described above in which the front cover 7 and the rear cover 8 are slidable horizontally to be opened and closed can reduce a footprint of the liquid discharge apparatus 1 including areas in which the front cover 7 and the rear cover 8 are opened and closed, compared with, for example, a configuration in which the front cover 7 and the rear cover 8 are opened and closed vertically. The front cover 7 and the rear cover 8 each includes openings at both ends of the front cover 7 and the rear cover 8 in the front-rear direction. When the front cover 7 and the rear cover 8 are closed, the front cover 7 and the rear cover 8 are arranged sequentially in the front-rear direction.

As illustrated in FIGS. 3 and 4, an apparatus body 50 of the liquid discharge apparatus 1 includes the housing 2, liquid dischargers 9A and 9B disposed on the housing 2. In the present embodiment, in particular, the apparatus body 50 is a portion of the liquid discharge apparatus 1, other than the front cover 7 and the rear cover 8. The front cover 7 and the rear cover 8 are slidable in the X direction with respect to the apparatus body 50.

When the front cover 7 and the rear cover 8 are opened, the liquid discharger 9A and the liquid discharger 9B in the liquid discharge apparatus 1 are exposed to the outside. Exposing the liquid discharger 9A and the liquid discharger 9B to the outside allows maintenance units 30, liquid discharge heads 20 (see FIG. 5), peripheral components of the liquid discharge heads 20 to be cleaned, or carriages to be replaced. While an image formation is performed, the front cover 7 and the rear cover 8 are closed. Accordingly, the liquid discharger 9A and the liquid discharger 9B are covered by the front cover 7 and the rear cover 8, respectively, and moving components such as the carriages of the liquid discharger 9A and the liquid discharger 9B may not be accessed from the outside. The liquid discharger 9A and the liquid discharger 9B are each arranged in a space closed by the front cover 7 and the rear cover 8, respectively. By so doing, liquid mists are prevented from scattering outside the liquid discharge apparatus 1 while the liquid is discharged. At the same time, airflows are circulated in the front cover 7 and the rear cover 8 by fans disposed in the liquid discharger 9A and the liquid discharger 9B. Accordingly, the generated liquid mists are circulated in the front cover 7 and the rear cover 8 to be collected.

The liquid discharge apparatus 1 of the present embodiment includes two liquid dischargers, the liquid discharger 9A and the liquid discharger 9B arranged in the X direction. The liquid discharger 9A discharges color ink and white color ink. The liquid discharger 9B discharges the pretreatment liquid. The liquid discharged by the liquid discharger 9A and the liquid discharger 9B is not limited to the above-described ink or liquid. However, the liquid discharged by the liquid discharger 9A and the liquid discharger 9B may be any liquid of color ink, white color ink, and pretreatment liquid. In particular, when the recording medium is a fabric, preferably, the pretreatment liquid is applied to the recording medium before an image is formed with ink on the recording medium. For this reason, preferably, either one of the liquid discharger 9A or the liquid discharger 9B discharges the pretreatment liquid.

The liquid discharger 9A and the liquid discharger 9B have a similar configuration. Accordingly, the liquid discharger 9A is described below. The liquid discharger 9A includes a carriage 10A, a guide rod 11, an electronic board 12, and a maintenance unit 30. The liquid discharger 9A and the liquid discharger 9B may also be referred to simply as a liquid discharger 9 when the liquid discharger 9A and the liquid discharger 9B are not distinguished. The carriages 10A and 10B may also be referred to simply as a carriage 10 when the carriages 10A and 10B are not distinguished. The liquid discharger 9 of the present embodiment is a portion including an entire area in which the carriage 10 moves. The liquid discharger 9 does not include the electronic board 12.

The guide rod 11 extends in the main-scanning direction. The carriage 10 is movable in the main-scanning direction along the guide rod 11. The carriage 10 includes multiple liquid discharge heads 20. The maintenance unit 30 is disposed at a position facing the guide rod 11 and on one side of the guide rod 11 in the left-right direction outside an area in which the liquid is discharged.

The electronic board 12 includes a controller to control a liquid discharge operation.

The maintenance unit 30 includes, for example, a wiper to clean nozzle surfaces of the liquid discharge heads 20 and a suction mechanism to suck the nozzle surfaces. The wiper may be a wiper made of, for example, rubber, or may be a web made of, for example, nonwoven fabric.

A process in which an image is formed on a recording medium by the above-described liquid discharge heads 20 is described below.

First, a recording medium is placed on the stage 3 and conveyed above the guide rail 4. Then, the recording medium is conveyed to the rear side of the liquid discharge apparatus 1, and the liquid discharger 9B applies the pretreatment liquid to the recording medium. Specifically, the pretreatment liquid is discharged from nozzles disposed on the liquid discharge heads 20 to the recording medium in the main-scanning direction while the carriage 10B is moved along the guide rod 11 in the main-scanning direction. Repeating the above-described operation at positions of the recording medium in the sub-scanning direction allows the pretreatment liquid to be applied to the recording medium. Subsequently, the stage 3 is moved to the front side of the liquid discharge apparatus 1, and the liquid discharger 9A discharges liquids of multiple colors onto the recording medium in a similar manner. When white color is printed on a recording medium, for example, the white color ink is discharged by the liquid discharger 9A. Subsequently, the stage 3 is moved to the rear side of the liquid discharger 9A again, and the white color ink is discharged to the recording medium by the liquid discharger 9A. In so doing, an image can be formed on the recording medium.

In the liquid discharge apparatus 1 as described above, the liquid discharged from the liquid discharge heads 20 is scattered around the liquid discharge heads 20 in the form of small liquid mists. As a result, components inside the liquid discharge apparatus 1 may be contaminated or a failure of the liquid discharge apparatus 1 may occur. In particular, the pretreatment liquid discharged by the liquid discharge heads 20 of the liquid discharger 9B contains salts such as acetate compounds and nitrate compounds and has high electrical conductivity. For this reason, when the pretreatment liquid is scattered in the form of liquid mists toward the electronic board 12, a failure of the electronic board 12 may occur.

Figure 5:
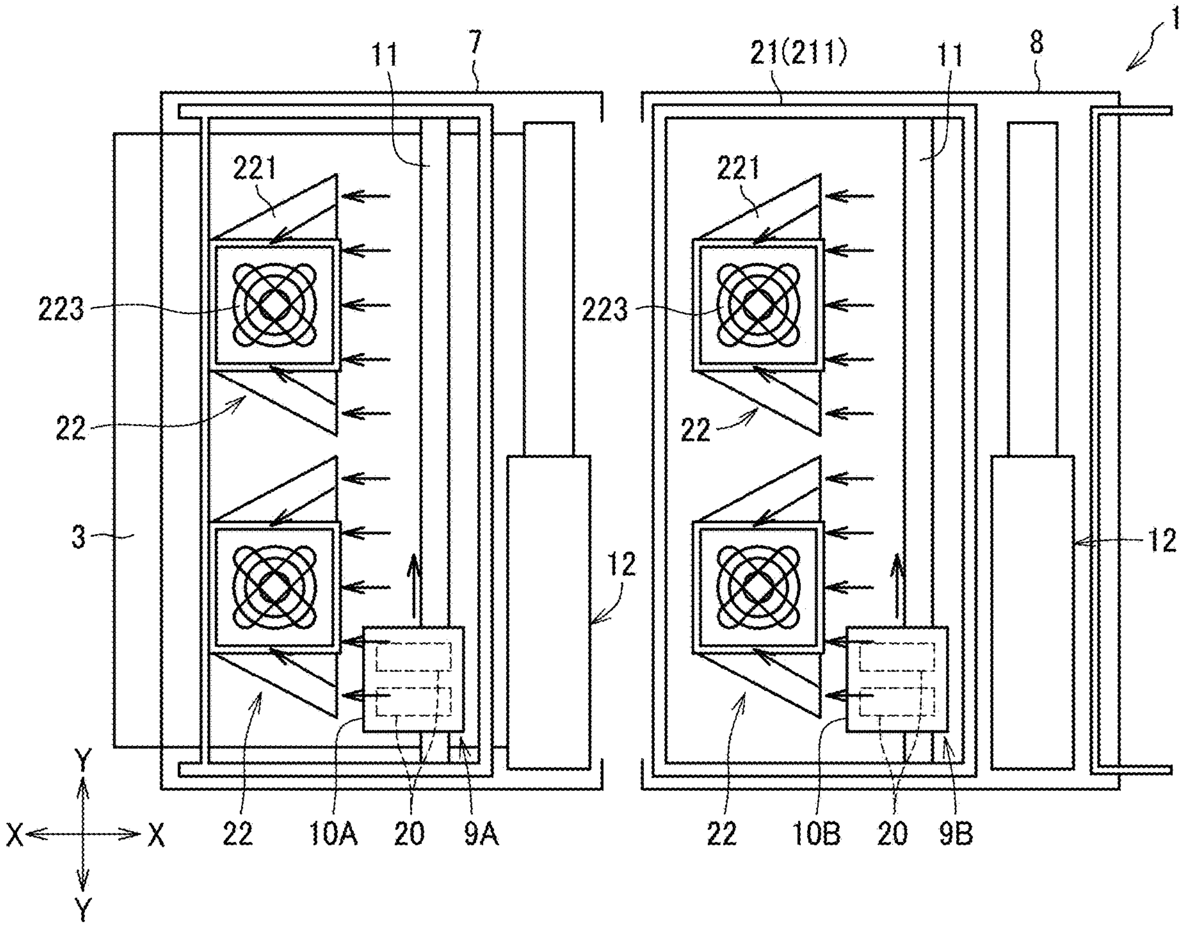
FIG. 5 is a diagram illustrating components inside a liquid discharge apparatus viewed from above, according to an embodiment of the present disclosure.
Figure 6:
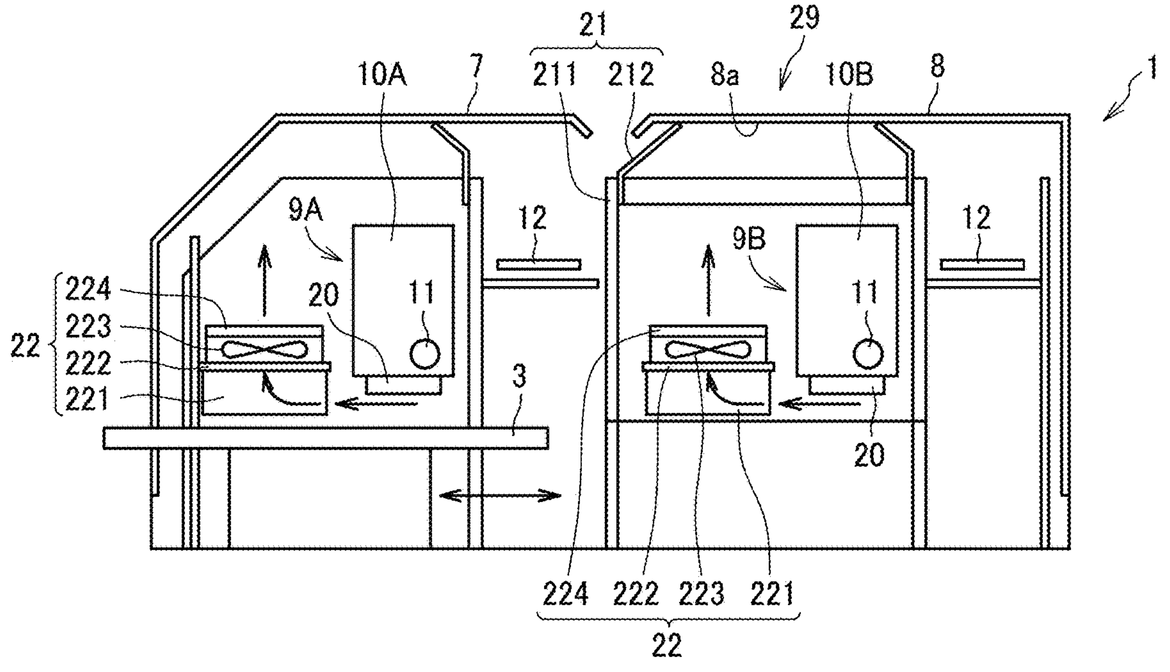
FIG. 6 is a diagram illustrating the components inside the liquid discharge apparatus of FIG. 5, viewed from a lateral side of the liquid discharge apparatus.
Figure 7:
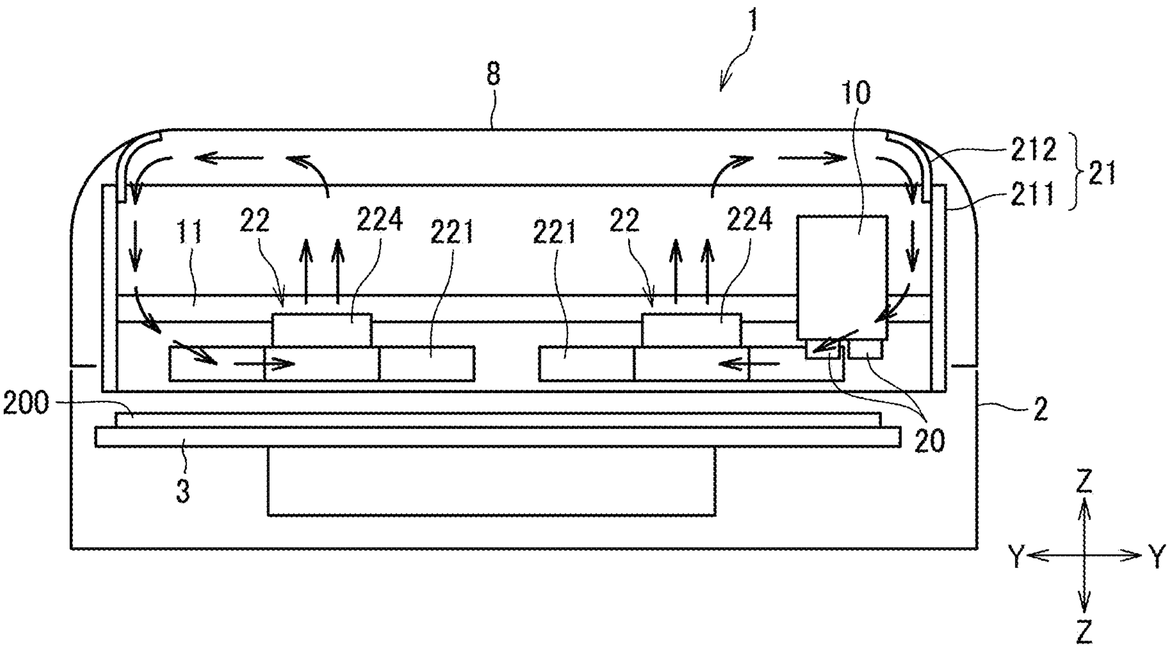
FIG. 7 is a diagram illustrating the components inside the liquid discharge apparatus of FIG. 5, viewed from the front side of the liquid discharge apparatus.

A configuration of the liquid discharge apparatus 1 according to the present embodiment for preventing the above-described disadvantages caused by the scattering of the liquid discharged by the liquid discharge heads 20 is described with reference to FIGS. 5, 6, and 7. FIG. 5 is a diagram illustrating components inside the liquid discharge apparatus 1, viewed from above. FIG. 6 is a diagram illustrating the components inside the liquid discharge apparatus 1, viewed from a lateral side of the liquid discharge apparatus 1. FIG. 7 is a diagram illustrating the components inside the liquid discharge apparatus 1, viewed from the front side of the liquid discharge apparatus 1.

An isolator 21 is disposed around the liquid discharger 9B including the liquid discharge heads 20 to discharge the pre-treatment liquid. As illustrated in FIG. 6, the isolator 21 includes a first isolating member 211 and second isolating members 212. The first isolating member 211 is formed of rigid body such as sheet metal and may be formed of a portion of the housing 2 of the liquid discharge apparatus 1. Preferably, the second isolating members 212 are formed of an elastic material. In the present embodiment, the second isolating members 212 are formed of Mylar (registered trademark). In the present embodiment, the first isolating member 211 and the second isolating members 212 are formed of different materials. However, the first isolating member 211 and the second isolating members 212 may be formed of a similar material.

As illustrated in FIG. 5, the first isolating member 211 surrounds four lateral sides of the liquid discharger 9B. In other words, the first isolating member 211 surrounds the liquid discharger 9B in a circumferential shape on a plane of FIG. 5 perpendicular to the vertical direction. In still other words, the first isolating member 211 surrounds the liquid discharger 9B in a circumferential shape by portions of the first isolating member 211 extending in the main-scanning direction which is the vertical direction in FIG. 5 and portions of the first isolating member 211 extending in the sub-scanning direction which is the horizontal direction in FIG. 5. Similarly, the second isolating members 212 are disposed such that the second isolating members 212 surrounds the four lateral sides of the liquid discharger 9B. As described above, the first isolating member 211 and the second isolating members 212 surround the four lateral sides of the liquid discharger 9B without gaps. As described above, the entire portions of the first isolating member 211 and portions of the second isolating members 212 form a first isolator, which surrounds the four lateral sides of the liquid discharger 9B.

The first isolating member 211 of the present embodiment is disposed over an entire area in which the carriage 10 including the liquid discharge heads 20 moves in the vertical direction in FIG. 5. The second isolating members 212 are fixed to upper ends of the first isolating member 211, and upper ends of the second isolating members 212 contact the rear cover 8. In other words, the second isolating members 212 are disposed such that the second isolating members 212 fill gaps between the first isolating member 211 and the rear cover 8 in the vertical direction in FIG. 6. Forming the second isolating members 212 of an elastic material allows the second isolating members 212 to contact the rear cover 8 without gaps in the vertical direction in FIG. 6. The isolator 21 of the present embodiment fills an area from a position below the lower ends of the liquid discharge heads 20, which is a position above an area in which the liquid is discharged from the liquid discharge heads 20, to a bottom surface 8*a* of a top plate of the rear cover 8 in the vertical direction of the isolator 21 without any gaps. In other words, the first isolating member 211 is not disposed in an area in which the stage 3 moves.

An upper surface of the liquid discharger 9B is covered by the second isolating members 212 and the bottom surface 8*a* of the top plate of the rear cover 8. As described above, the portions of the second isolating members 212 and the bottom surface 8*a* of the rear cover 8 form a second isolator that covers the upper surface of the liquid discharger 9B, which is a surface of the liquid discharger 9B opposite to a surface of the liquid discharger 9B from which the liquid is discharged. However, the upper surface of the liquid discharger 9B may be covered only by the second isolating members 212.

The first isolator that surrounds the four lateral sides of the liquid discharger 9B and the second isolator that covers the upper surface of the liquid discharger 9B are disposed continuously, with no gaps between the first isolator and the second isolator. Specifically, the second isolating members 212 are attached to the first isolating member 211 such that the portions of the second isolating members 212 overlap the first isolating member 211 in the vertical direction. By so doing, the second isolating members 212 fill the gaps between the first isolating member 211 and the bottom surface 8*a* of the top plate of the rear cover 8.

The above-described first isolator and the second isolator cover all five surfaces of the liquid discharger 9B except the lower surface of the liquid discharger 9B. Accordingly, the liquid discharger 9B is isolated from a space in which the electronic board 12 is disposed, which is outside a space in which the liquid discharger 9B is disposed. As a result, the liquid discharged from the liquid discharger 9B can be prevented from scattering to the space in which, for example, the electronic board 12 is disposed outside the space in which the liquid discharger 9B is disposed. In addition, the lower surface of the liquid discharger 9B is not covered. Accordingly, the liquid mists escape from a space around the lower surface of the liquid discharger 9B. As a result, the liquid mists can be prevented from filling the space in which the liquid discharger 9B is isolated. Accordingly, mechanical deterioration of the liquid discharger 9B can be prevented. In particular, the lower surface of the liquid discharger 9B is a surface from which the liquid is discharged. For this reason, preferably, the lower surface of the liquid discharger 9B is opened such that the liquid discharger 9B functions favorably. The first isolator and the second isolator cover the four lateral sides and the upper side of the liquid discharger 9B. However, the first isolator and the second isolator may not fully cover the four lateral sides and the upper side of the liquid discharger 9B and may have a gap. For example, the first isolator and the second isolator may have a gap through which a harness passes. The smaller the gap, the more the liquid can be prevented from scattering to the outside of the first isolator and the second isolator.

In addition, in the configuration in which the liquid discharge apparatus 1 includes the multiple liquid dischargers 9A and 9B as in the present embodiment, at least one of the liquid discharger 9A and the liquid discharger 9B is isolated by the first isolator or the second isolator. By so doing, the liquid discharged from the liquid discharger 9A and the liquid discharger 9B can be prevented from being mixed.

In addition, airflow generators 22 are disposed in front of the liquid discharger 9A and the liquid discharger 9B. The airflow generators 22 are disposed on one side and the other side of the liquid discharger 9A and the liquid discharger 9B in the main-scanning direction and arranged at positions facing the conveyance direction of the recording medium with respect to the liquid discharger 9A or the liquid discharger 9B.

As illustrated in FIGS. 5 and 6, each of the airflow generators 22 includes an intake duct 221, a filter 222, a fan 223, and an exhaust duct 224. The intake duct 221 has a shape that widens toward the right side of FIG. 5, which is an area from which air is taken. The intake duct 221 can take in air in a wider area from areas in which the liquid discharger 9A and the liquid discharger 9B are disposed. Accordingly, efficiency in collecting the liquid mists by the airflow generators 22 is enhanced. The filter 222 can collect liquid mists in the air taken in from the intake duct 221.

As indicated by arrows in FIG. 5, the fans 223 generate airflows that flow from areas in which the carriage 10A and 10B are moved, i.e., areas in which the guide rods 11 are disposed, toward the intake ducts 221. The generated airflows are exhausted upward from the exhaust ducts 224 via the filters 222.

As illustrated in FIG. 7, exhaust air that is exhausted from the exhaust ducts 224 flows along a bottom surface of a top plate and inner surfaces of side plates of the front cover 7. Airflows of the exhaust air flow again toward the intake ducts 221 by the intake air from the intake ducts 221, and the airflows circulate in the front cover 7. The airflows that circulate in the front cover 7 causes liquid mists in the front cover 7 to flow toward the airflow generators 22 to be collected by the filters 222. The airflow generators 22 that are disposed in the rear cover 8 causes airflows to circulate in the rear cover 8 in a similar manner.

For the liquid discharger 9B, the airflow generators 22 are disposed in the isolator 21. By so doing, airflows that circulate in the isolator 21 are generated. Liquid mists in the isolator 21 can be collected by the filters 222. As a result, the liquid mists can be prevented from filling the inside of the isolator 21.

In some embodiments described above, the isolator 21 that isolates the liquid discharger 9B including the liquid discharge heads 20 for discharging the pretreatment liquid has been described. However, an isolator that isolates the liquid discharger 9A may be disposed.

Figure 8:
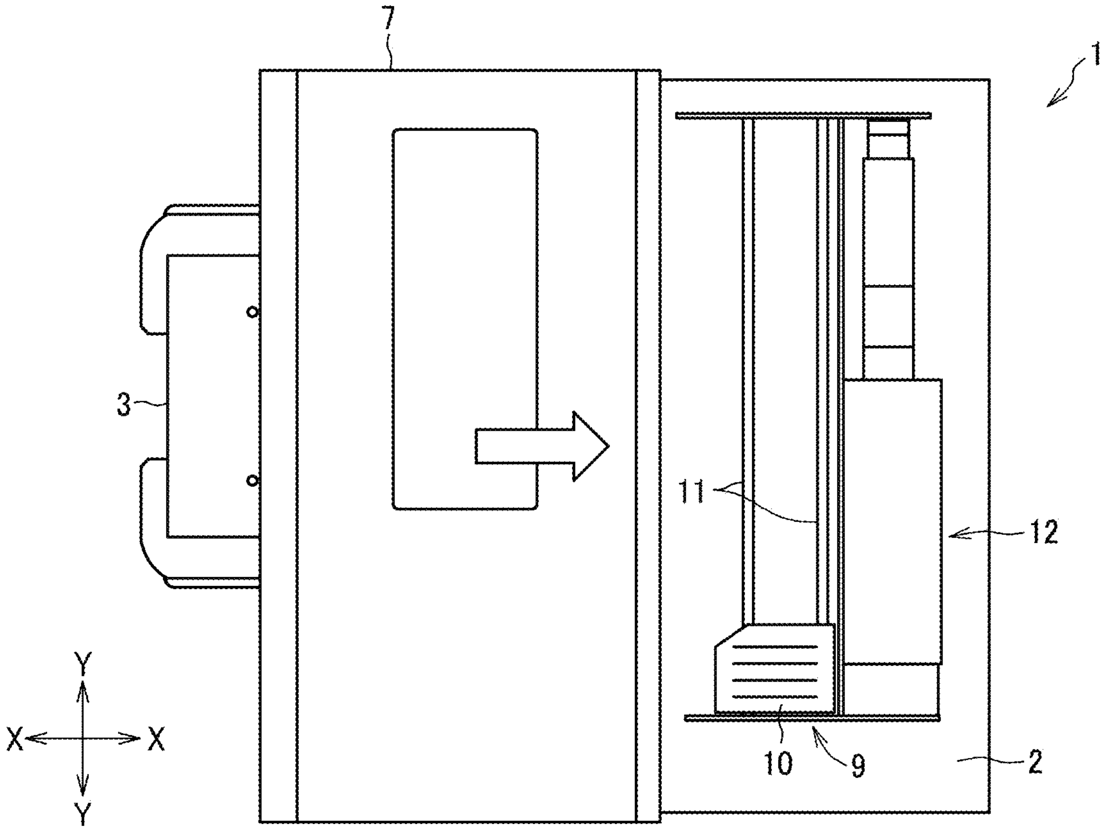
FIG. 8 is a plan view of a liquid discharge apparatus including one liquid discharger, according to an embodiment of the present disclosure.
Figure 9:
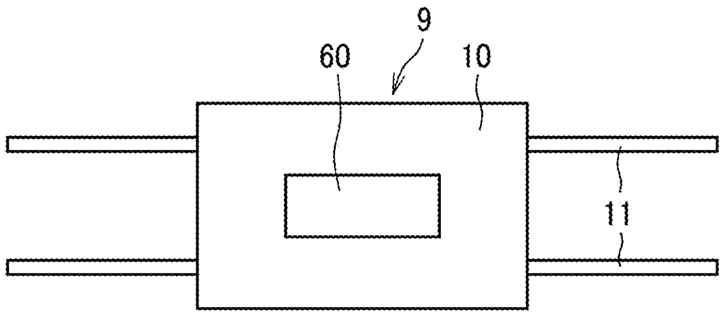
FIG. 9 is a diagram illustrating a carriage in which one liquid discharge head unit is disposed, according to an embodiment of the present disclosure.
Figure 10:
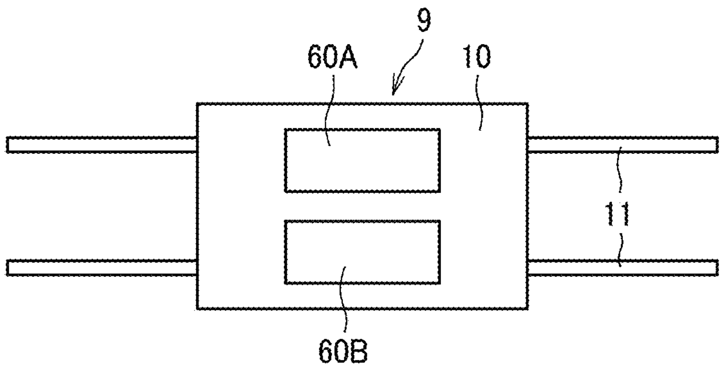
FIG. 10 is a diagram illustrating a carriage in which two liquid discharge head units are disposed, according to an embodiment of the present disclosure.
Figure 11:
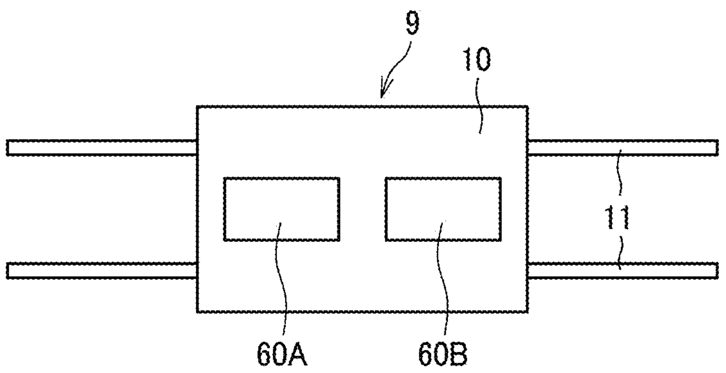
FIG. 11 is a diagram illustrating a carriage in which two liquid discharge head units are arranged in a direction different from a direction in which the two liquid discharge head units are disposed in FIG. 10, according to an embodiment of the present disclosure.

In some embodiments described above, the liquid discharge apparatus 1 includes the multiple (two) liquid discharger 9A and the liquid discharger 9B. The liquid discharger 9A and the liquid discharger 9B includes the carriages 10A and 10B, respectively, each of which includes the liquid discharge heads 20 and the guide rod 11. However, embodiments of the present disclosure are not limited to such a configuration. For example, as illustrated in FIG. 8, the liquid discharge apparatus 1 may include only one liquid discharger 9. In the liquid discharge apparatus 1 of FIG. 8, a cover 7 as an opening and closing member is disposed such that the liquid discharger 9 is exposed. As illustrated in FIG. 9, the liquid discharger 9 includes guide rods 11, the carriage 10, and a liquid discharge head unit 60 disposed in the carriage 10. The liquid discharge head unit 60 includes multiple liquid discharge heads. However, the liquid discharge head unit 60 may include a single liquid discharge head. The liquid discharge head unit 60 discharges a pretreatment liquid, white color ink or color ink. The liquid discharge apparatus 1 may include three or greater than three liquid dischargers 9. As illustrated in FIG. 10, the carriage 10 may include multiple liquid discharge head units 60A and 60B. In this case, for example, the white color ink or the color ink is discharged by the liquid discharge head unit 60A, and the pretreatment liquid is discharged by the liquid discharge head unit 60B. The liquid discharge head units 60A and 60B may be arranged in the sub-scanning direction as illustrated in FIG. 10. Alternatively, the liquid discharge head units 60A and 60B may be arranged in the main-scanning direction as illustrated in FIG. 11.

Figure 12:
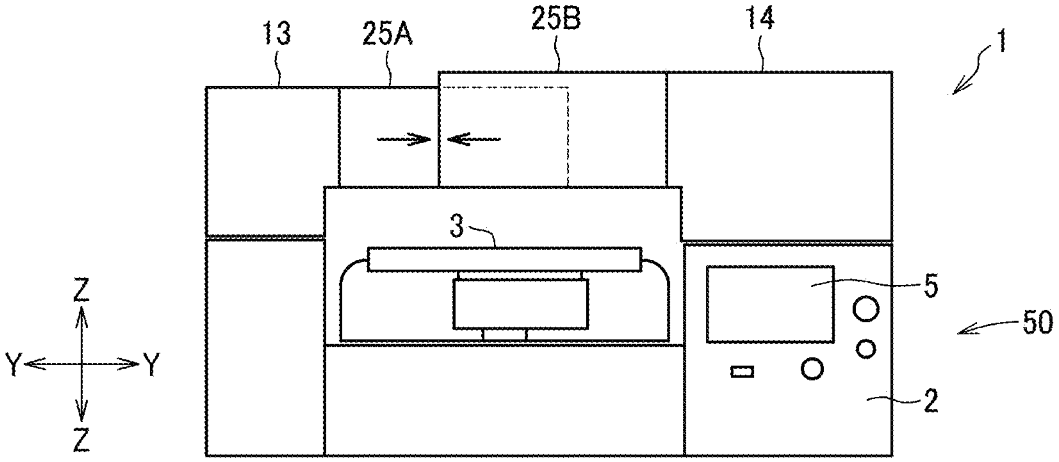
FIG. 12 is a front view of a liquid discharge apparatus including covers to open and close in the right-left direction and inward, with the covers closed, according to an embodiment of the present disclosure.

In some embodiments, the configuration has been described in which the multiple opening and closing members slide in the front-rear direction to open and close the inside of the liquid discharge apparatus. However, embodiments of the present disclosure are not limited to such a configuration. For example, as illustrated in FIG. 12, the liquid discharge apparatus 1 includes a left cover 13 and a right cover 14, which serve as opening and closing members or covers on the apparatus body 50 that includes, for example, the liquid discharger 9. In FIG. 12, the left cover 13 and the right cover 14 are positioned at positions at which the left cover 13 and the right cover 14 are closed. An arrow illustrated in the left cover 13 indicates a direction in which the left cover 13 is opened. An arrow illustrated in the right cover 14 indicates a direction in which the right cover 14 is opened.

Figure 13:
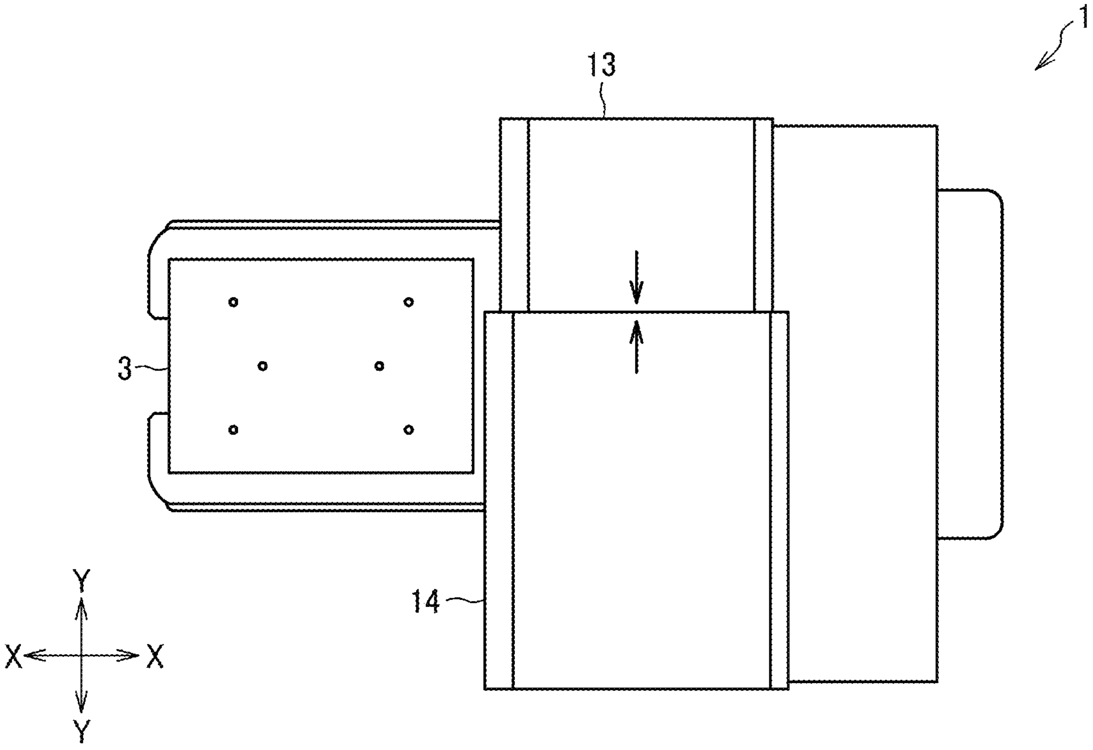
FIG. 13 is a plan view of the liquid discharge apparatus of FIG. 12.
Figure 14:
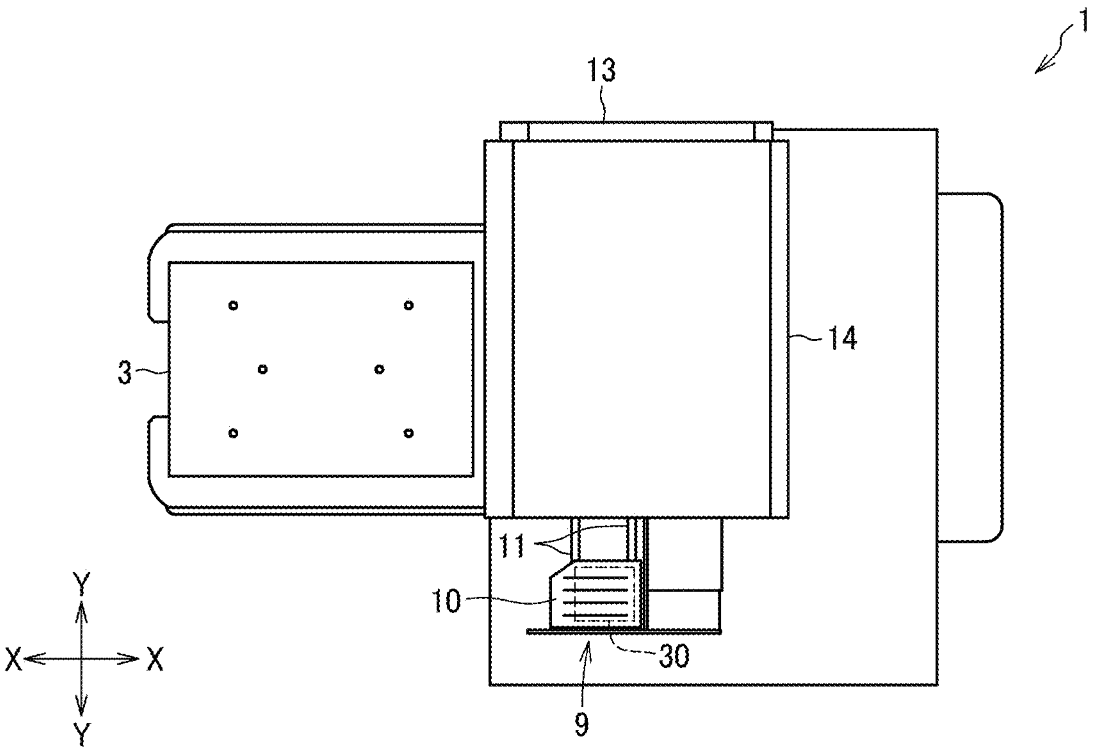
FIG. 14 is a plan view of the liquid discharge apparatus of FIG. 13 with a right cover opened.
Figure 15:
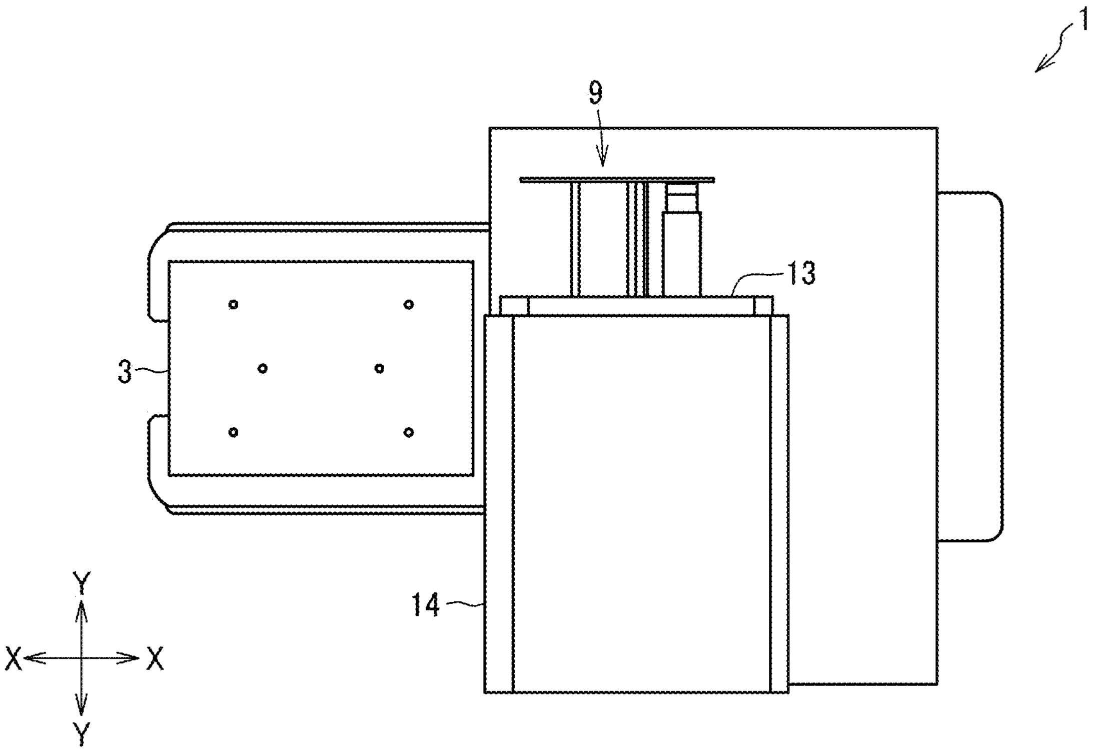
FIG. 15 is a plan view of the liquid discharge apparatus of FIG. 13 with a left cover opened.

As illustrated in FIG. 13, when the left cover 13 and the right cover 14 are closed, the liquid discharger 9 is covered by the left cover 13 and the right cover 14. Alternatively, as illustrated in FIG. 14, moving the right cover 14 in the left direction, i.e., toward the upper side in FIG. 14, causes a right-side portion of the liquid discharger 9 to be exposed. As illustrated in FIG. 15, moving the left cover 13 in the right direction, i.e., toward the lower side in FIG. 15, causes a left-side portion of the liquid discharger 9 to be exposed.

Figure 16:
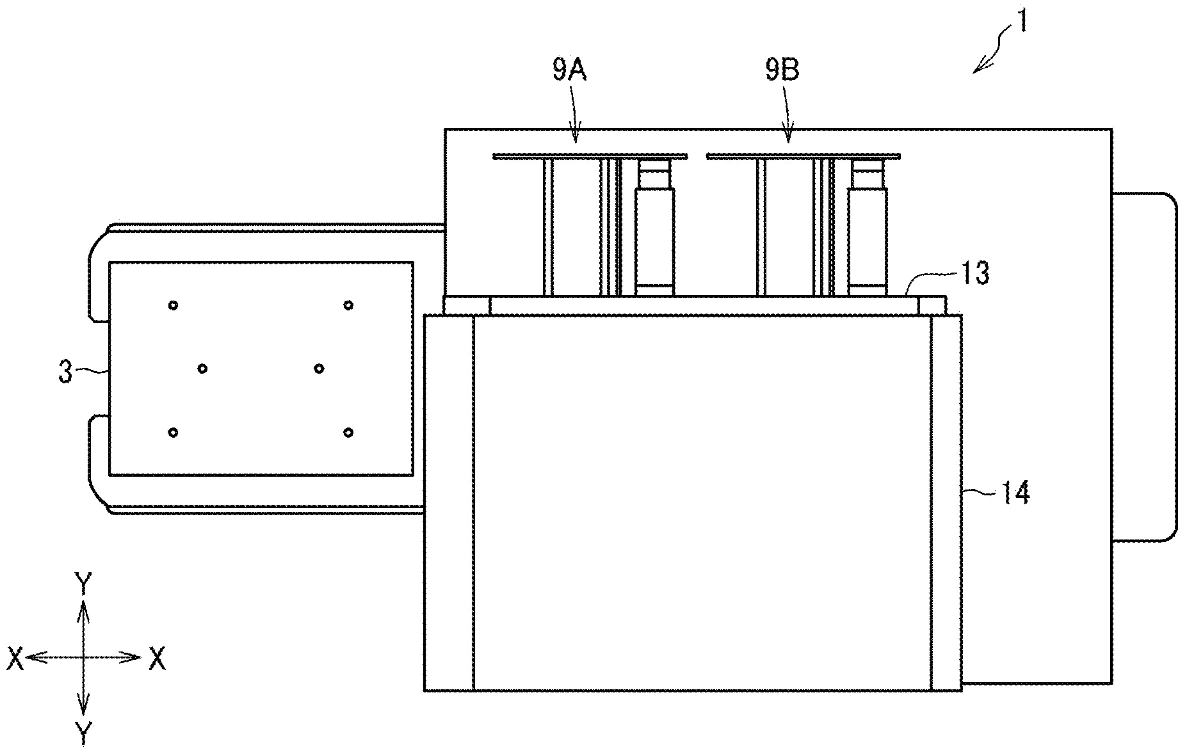
FIG. 16 is a plan view of a liquid discharge apparatus including multiple liquid dischargers and covers to open and close in the right-left direction, according to an embodiment of the present disclosure.

In the above-described embodiment, the liquid discharge apparatus 1 includes the single liquid discharger 9. However, as illustrated in FIG. 16, the liquid discharge apparatus 1 may include the multiple liquid dischargers 9A and 9B in a configuration in which the left cover 13 and the right cover 14 are moved in the right-left direction.

In the above-described embodiment illustrated in FIG. 12, the left cover 13 and the right cover 14 are opened inward. However, embodiments of the present disclosure are not limited to such a configuration. For example, as illustrated in FIG. 17, in the liquid discharge apparatus 1 of the present embodiment, the left cover 13 and the right cover 14 may be opened outward as indicated by arrows in FIG. 17.

Figure 18:
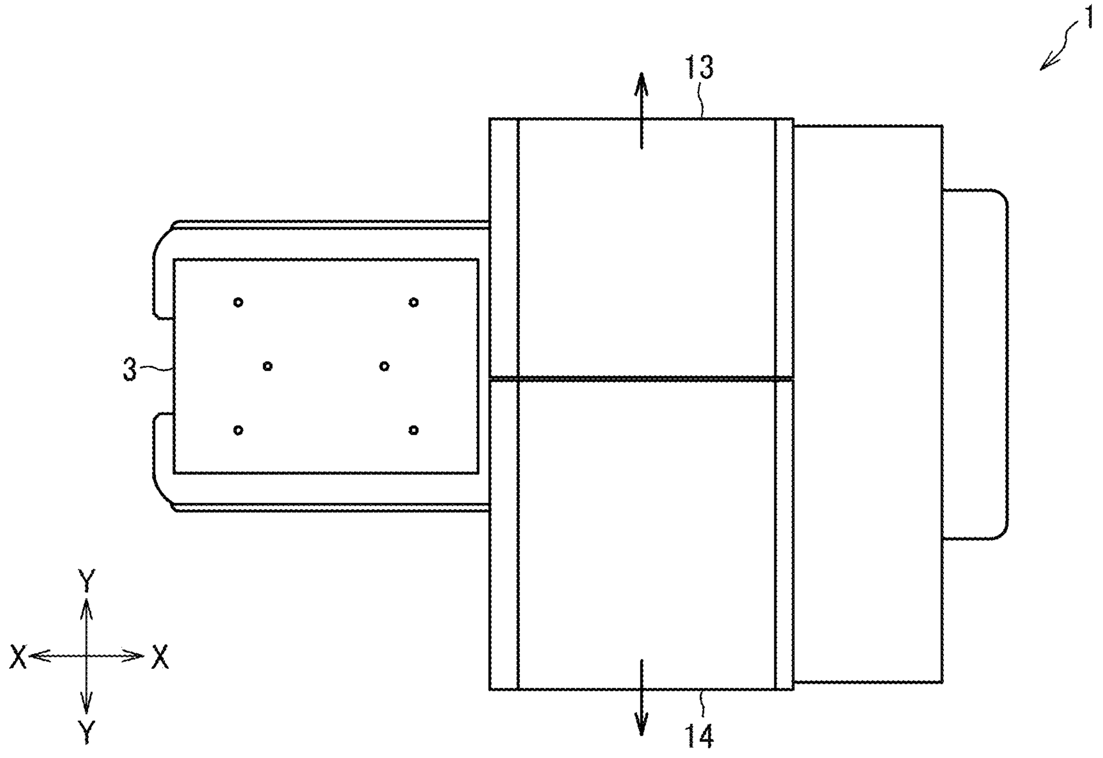
FIG. 18 is a plan view of the liquid discharge apparatus of FIG. 17, with the covers closed.
Figure 19:
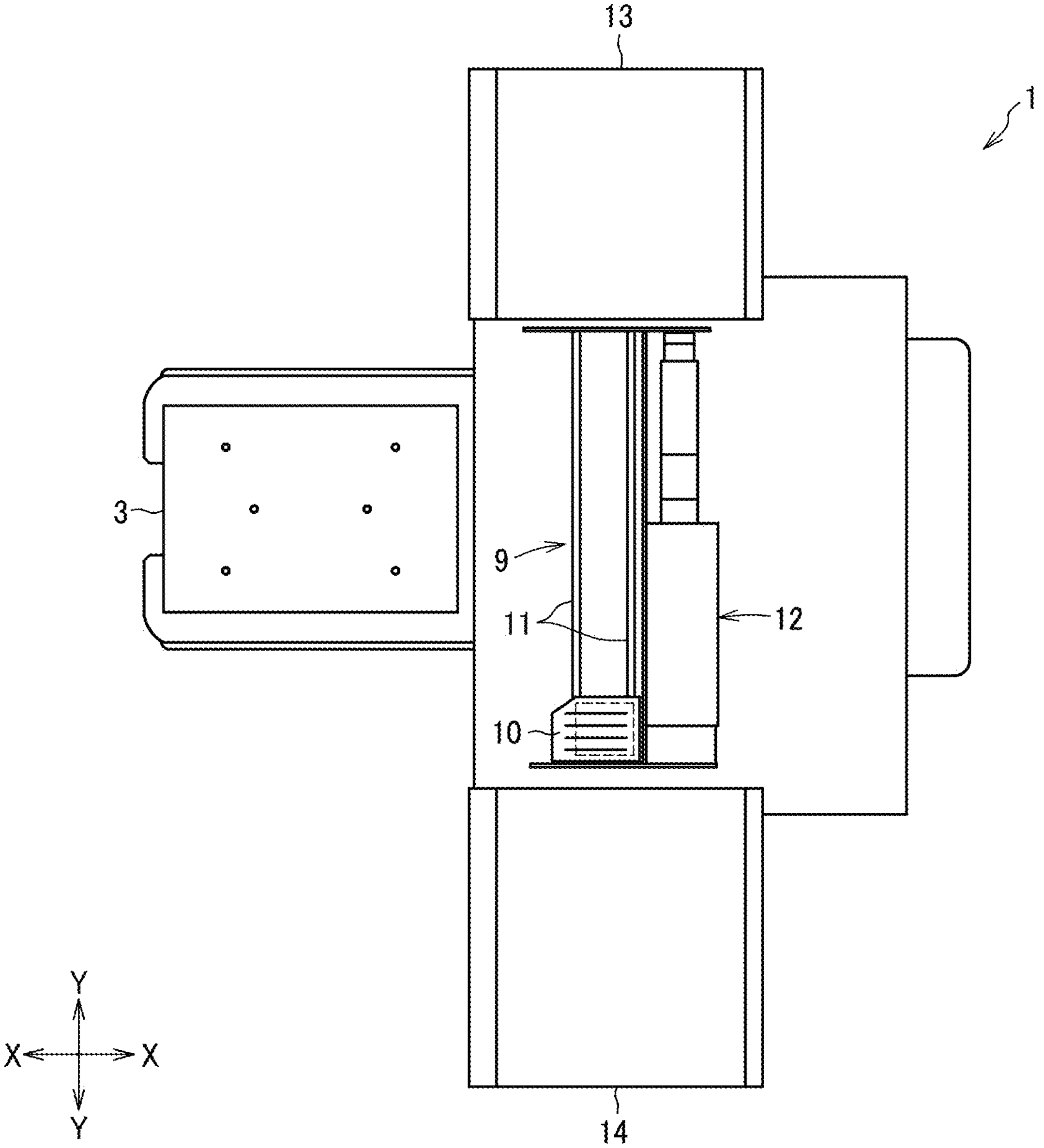
FIG. 19 is a plan view of the liquid discharge apparatus of FIG. 18, with the covers opened.

As illustrated in FIG. 18, when the left cover 13 and the right cover 14 are closed, the liquid discharger 9 is covered by the left cover 13 and the right cover 14. As illustrated in FIG. 19, when the left cover 13 and the right cover 14 are opened, the liquid discharger 9 is exposed to the outside.

Figure 17:
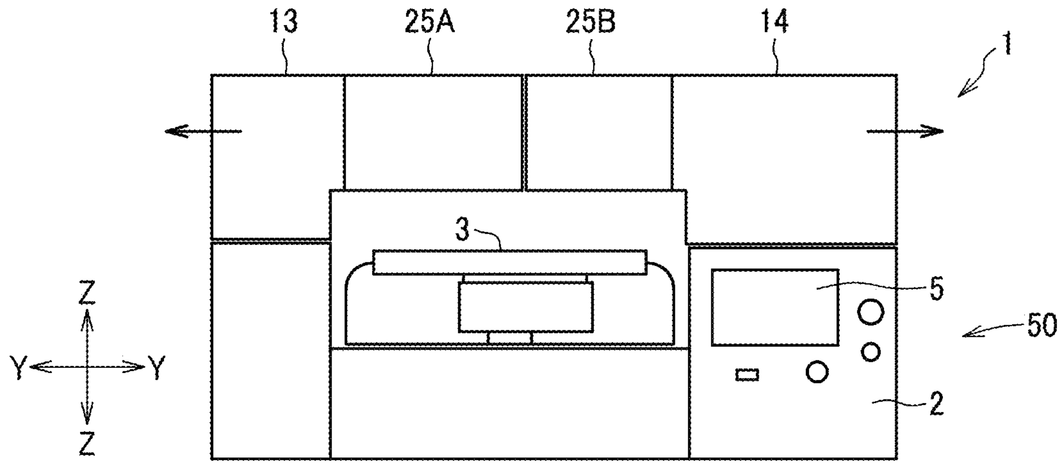
FIG. 17 is a front view of a liquid discharge apparatus including covers to open and close in the right-left direction and outward, according to an embodiment of the present disclosure.

The configuration in which the left cover 13 and the right cover 14 open inward as illustrated in FIG. 12 can reduce the footprint of the liquid discharge apparatus 1 including areas in which the left cover 13 and the right cover 14 move, as compared with the configuration in which the left cover 13 and the right cover 14 open outward as illustrated in FIG. 17.

Figure 20:
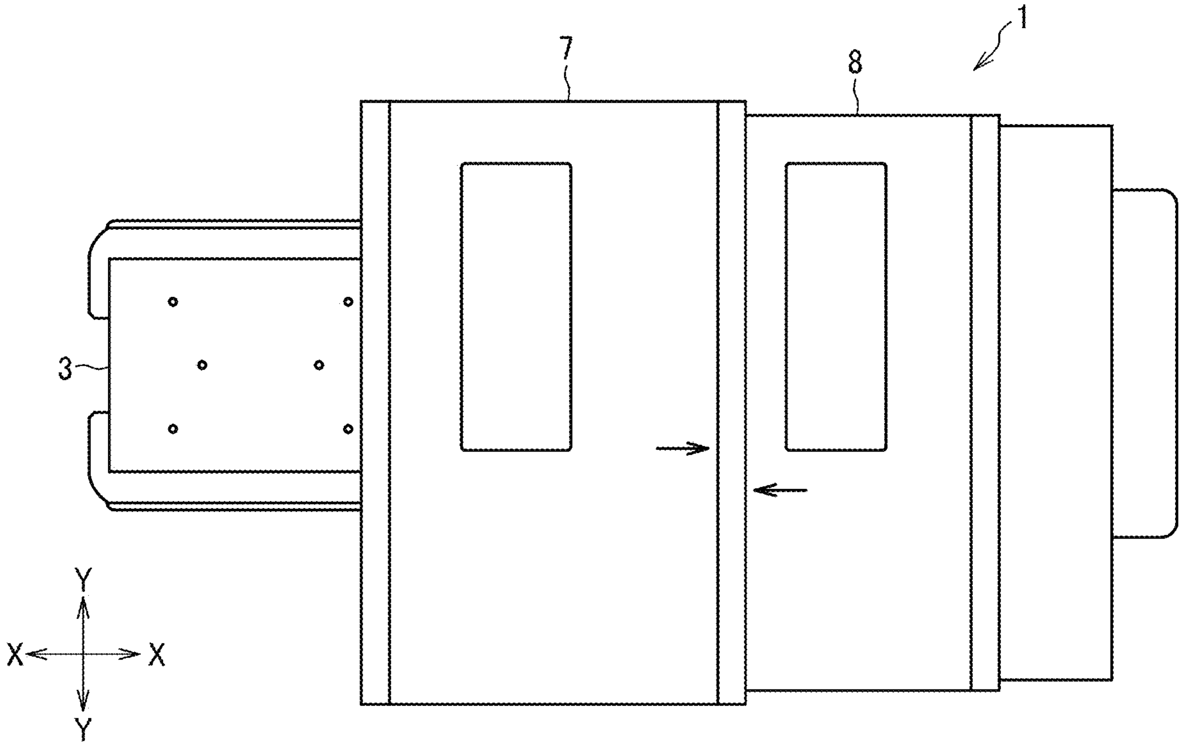
FIG. 20 is a plan view of a liquid discharge apparatus including a front cover and a rear cover to open and close in the front-rear direction and inward, with the front cover and the rear cover closed.
Figure 21:
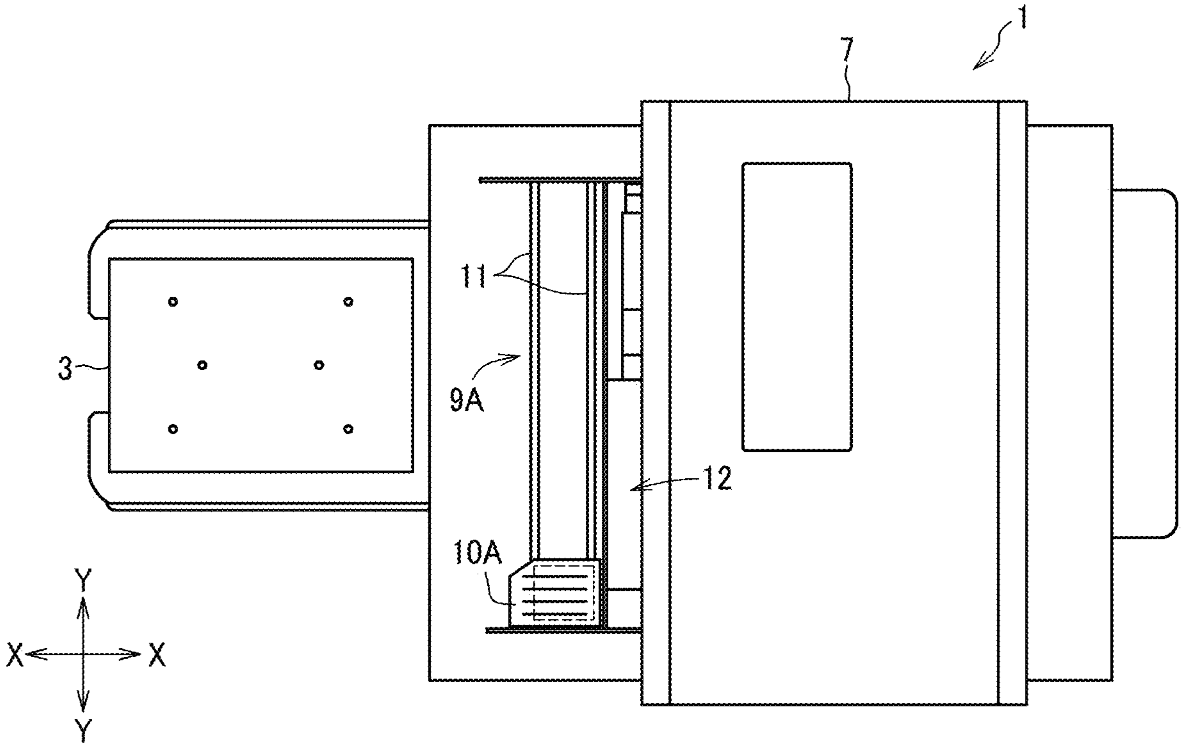
FIG. 21 is a plan view of the liquid discharge apparatus of FIG. 20, with the front cover opened.
Figure 22:
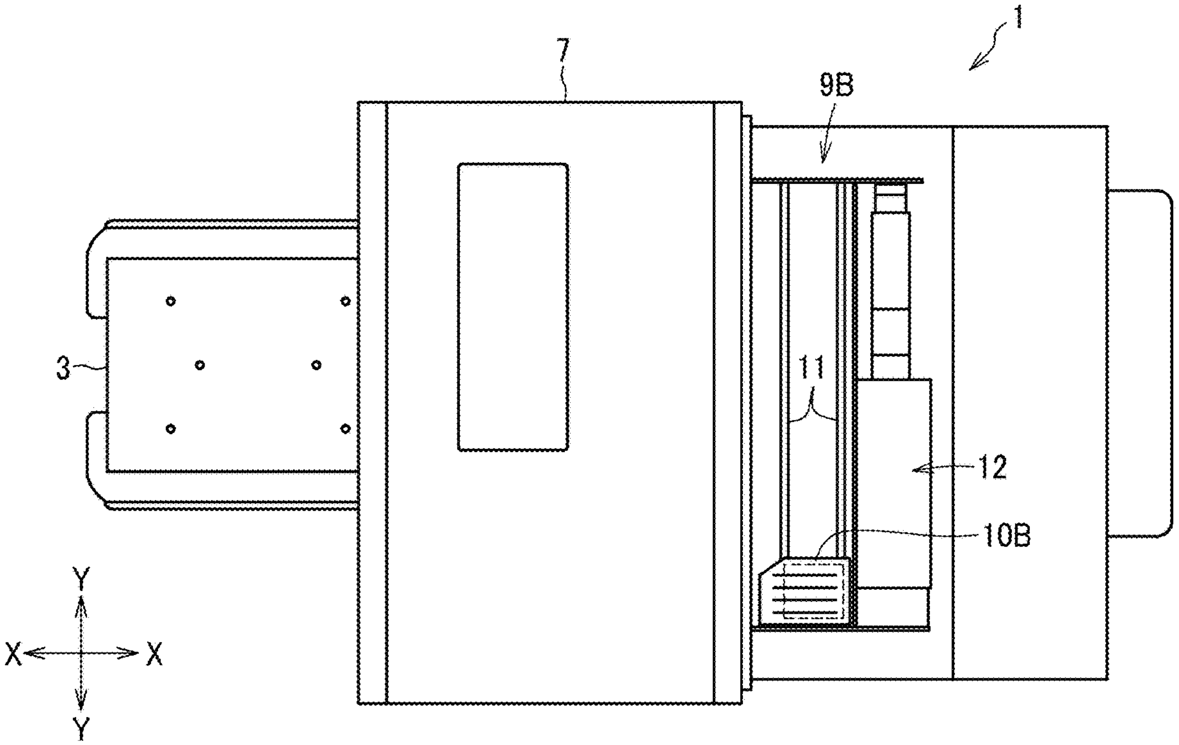
FIG. 22 is a plan view of the liquid discharge apparatus of FIG. 20, with the rear cover opened.

In addition, as illustrated in FIG. 20, in a configuration in which the front cover 7 and the rear cover 8 are opened in the front-rear direction, the front cover 7 and the rear cover 8 may open inward. As illustrated in FIG. 21, opening the front cover 7 causes the liquid discharger 9A to be exposed to the outside. As illustrated in FIG. 22, opening the rear cover 8 causes the liquid discharger 9B to be exposed to the outside.

Figure 23:
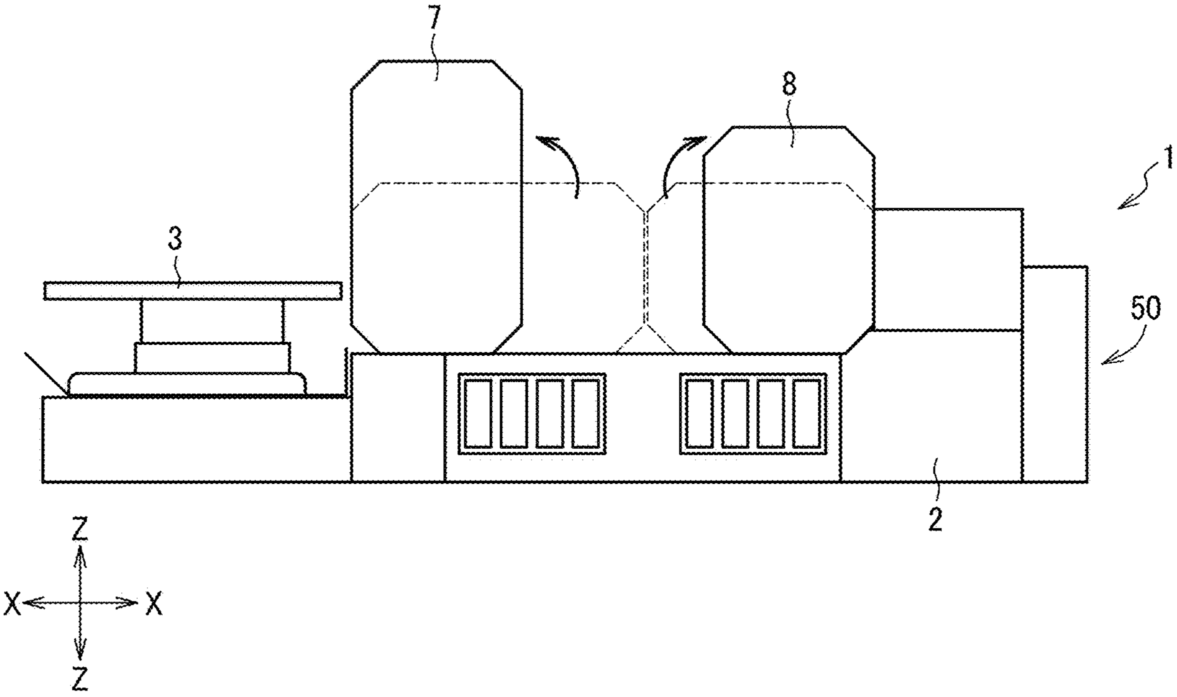
FIG. 23 is a side view of a liquid discharge apparatus including covers to rotate to open and close, according to an embodiment of the present disclosure.
Figure 24:
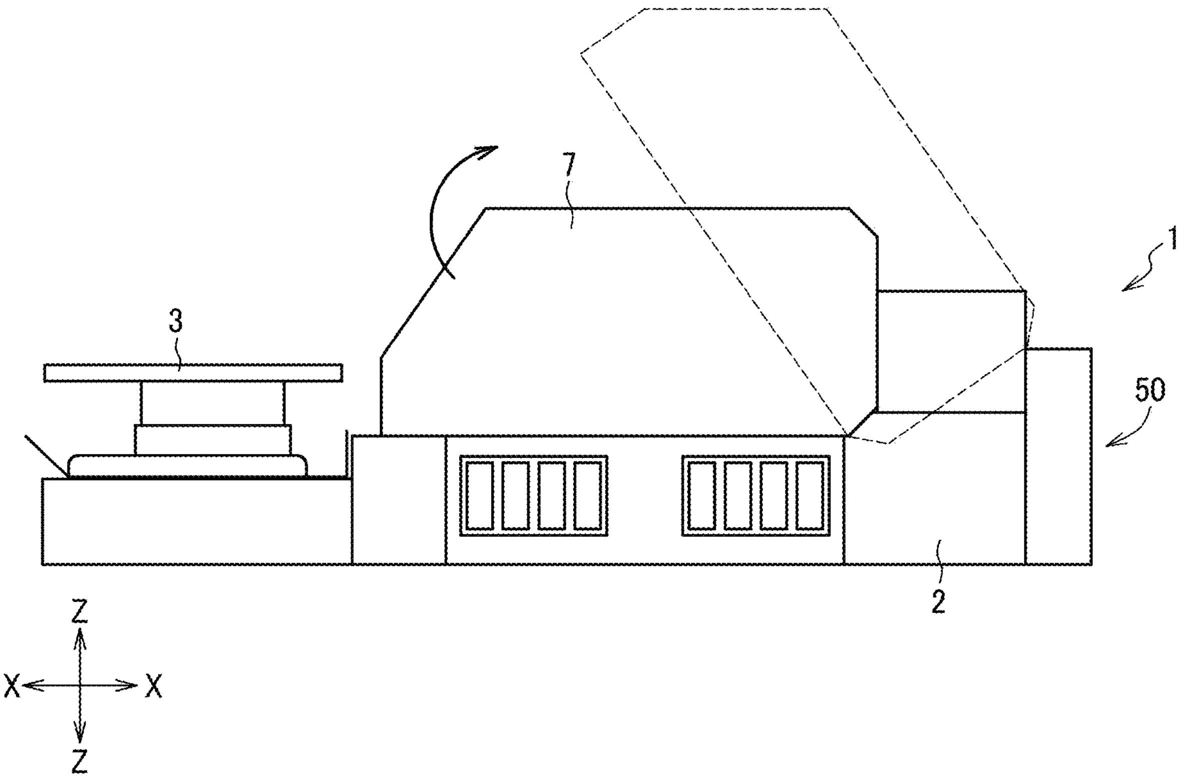
FIG. 24 is a side view of a liquid discharge apparatus including a cover to rotate to open and close, different from the covers in FIG. 23, according to an embodiment of the present disclosure.

Embodiments of the present disclosure are not limited to a configuration of a liquid discharge apparatus including opening and closing members which slide to open and close. For example, as illustrated in FIG. 23, the front cover 7 may rotate forward to open and the rear cover 8 may rotate rearward to open. Alternatively, as illustrated in FIG. 24, only the front cover 7 may be provided for the liquid discharge apparatus 1 and the front cover 7 may rotate rearward to open.

An isolator that isolates the liquid discharger 9 may be included in the liquid discharge apparatus 1 illustrated in FIGS. 8, 9, 10, 11, 12, 16, 17, 20, 23, and 24, similarly to the above-described embodiments. By so doing, the liquid can be prevented from scattering to the outside of the liquid discharger 9.

Embodiments of the present disclosure have been described as above. However, embodiments of the present disclosure are not limited to the embodiments described above, and various modifications and enhancements are possible without departing from the gist of the present disclosure.

In embodiments of the present disclosure, the liquid to be discharged is not limited to a particular liquid as long as the liquid has a viscosity or surface tension to be discharged from a liquid discharge head. However, preferably, the viscosity of the liquid is not greater than 30 mPa·s under ordinary temperature and ordinary pressure or by heating or cooling. More specifically, examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are employed for, for example, inkjet ink, a surface treatment solution, liquid for forming components of an electronic element and a light-emitting element or a resist pattern of an electronic circuit, or a material solution for three-dimensional fabrication.

The liquid includes not only ink but also paint, pretreatment liquid, binder, and overcoat liquid.

In embodiments of the present disclosure, the term "liquid discharge apparatus" is an apparatus which includes a carriage or carriages including liquid discharge heads and drives the liquid discharge heads to discharge liquid. The term "liquid discharge apparatus" used here includes, in addition to apparatuses to discharge liquid to a recording medium to which the liquid can adhere, apparatuses to discharge liquid into gas (air) or liquid.

The liquid discharge apparatus can include at least one of devices for feeding, conveying, and ejecting a material to which liquid can adhere. The liquid discharge apparatus can further include at least one of a pretreatment apparatus and a post-treatment apparatus.

Examples of the liquid discharge apparatus include an image forming apparatus which is an apparatus that forms an image on a sheet by discharging ink, and a stereoscopic fabrication apparatus, i.e., three-dimensional fabrication apparatus, which discharges fabrication liquid onto a powder layer in which powder is formed in a layer shape to fabricate a stereoscopic fabrication object, i.e., three-dimensional object.

Such liquid discharge apparatus is not limited to an apparatus that discharges liquid to visualize meaningful images, such as letters or figures. For example, the liquid discharge apparatus may be an apparatus that forms meaningless images such as meaningless patterns or an apparatus that fabricates three-dimensional images.

The above-described term "recording medium to which liquid can adhere" denotes, for example, a material or a medium onto which liquid is adhered at least temporarily, a material or a medium onto which liquid is adhered and fixed, or a material or a medium onto which liquid is adhered and into which the liquid permeates. Examples of "material to which liquid can adhere" include sheets of paper, recording media such as recording sheets, film, and cloth, electronic components such as electronic boards and piezoelectric elements, and media or medium such as powder layers, organ models, and testing cells. The "recording medium onto which liquid can adhere" includes any material on which liquid adheres unless particularly limited.

The above-described recording medium onto which liquid can adhere may be any material as long as liquid can temporarily adhere such as paper, thread, fiber, cloth, leather, metal, plastic, glass, wood, or ceramics.

The liquid discharge apparatus can be an apparatus in which the liquid discharge head and a material to which liquid can adhere move relatively to each other. However, the liquid discharge apparatus is not limited to such an apparatus. Examples of the liquid discharge apparatus include a serial-type apparatus which moves the liquid discharge head, and a line-type apparatus which does not move the liquid discharge head.

Other examples of the liquid discharge device include a treatment liquid application device that discharges treatment liquid to a sheet to apply the treatment liquid to the surface of the sheet for the purpose of modifying the surface of the sheet, and an injection granulation device that injects composition liquid in which a raw material is dispersed in a solution through a nozzle to granulate fine particles of the raw material.

The terms, image formation, recording, printing, image printing, and fabricating employed in embodiments of the present disclosure can be employed synonymously with each other.

Aspects of the present disclosure are, for example, as follows.

First Aspect

A liquid discharge apparatus includes a liquid discharge head, an electronic board, circuitry, and an isolator. The liquid discharge head discharges liquid. The circuitry is disposed on the electronic board to control the liquid discharge head. The isolator is disposed between the liquid discharge head and the electronic board to isolate the liquid discharge head from the electronic board. The isolator includes a first isolator and a second isolator. The first isolator surrounds four lateral sides of the liquid discharge head. The second isolator contacts the first isolator and surrounds the four lateral sides above the liquid discharge head.

Second Aspect

The liquid discharge apparatus according to the first aspect, further includes an airflow generator inside the isolator to generate an airflow circulating inside the isolator.

Third Aspect

The liquid discharge apparatus according to the first aspect or the second aspect, further includes a body and a cover. The body accommodates the liquid discharge head and the electronic board. The cover openably closes the body. The isolator contacts the cover at a closed position. The cover at the closed position and the isolator surround the four lateral sides and an upper side of the liquid discharge head from the electronic board.

Fourth Aspect

In the liquid discharge apparatus according to the third aspect, the second isolator has elasticity.

Fifth Aspect

In the liquid discharge apparatus according to any one of the first to the fourth aspect, further includes another liquid discharge head to discharge a pretreatment liquid. The isolator isolates said another liquid discharge head from the electronic board.

Sixth Aspect

The liquid discharge apparatus according to any one of the first to the fifth aspect, further includes multiple liquid discharge heads including the liquid discharge head. The isolator isolates at least one of the multiple liquid discharge heads from the electronic board.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A liquid discharge apparatus comprising:

a liquid discharge head configured to discharge a liquid downward;

an electronic board;

circuitry on the electronic board to control the liquid discharge head;

an isolator between the liquid discharge head and the electronic board to isolate the liquid discharge head from the electronic board, the isolator including:

a first isolator surrounding four lateral sides of the liquid discharge head, and a second isolator contacting the first isolator, the second isolator surrounding the four lateral sides above the liquid discharge head;

a body accommodating the liquid discharge head and the electronic board; and a cover to openably close the body, wherein the isolator contacts the cover at a closed position, and wherein the cover at the closed position and the isolator surround the four lateral sides and an upper side of the liquid discharge head from the electronic board.

2. The liquid discharge apparatus according to claim 1, further comprising an airflow generator inside the isolator to generate an airflow circulating inside the isolator.

3. The liquid discharge apparatus according to claim 1, wherein the second isolator has elasticity.

4. The liquid discharge apparatus according to claim 1, further comprising another liquid discharge head to discharge a pretreatment liquid, wherein the isolator isolates said another liquid discharge head from the electronic board.

5. The liquid discharge apparatus according to claim 1, further comprising multiple liquid discharge heads including the liquid discharge head, wherein the isolator isolates at least one of the multiple liquid discharge heads from the electronic board.

* * * * *